(12) United States Patent
He et al.

(10) Patent No.: US 8,930,839 B2
(45) Date of Patent: Jan. 6, 2015

(54) AUTOMATICALLY ARRANGING OF ICONS ON A USER INTERFACE

(75) Inventors: Li He, Beijing (CN); Peng Liu, Beijing (CN)

(73) Assignee: Yahoo! Inc., Sunnyvale, CA (US)

(*) Notice: Subject to any disclaimer, the term of this patent is extended or adjusted under 35 U.S.C. 154(b) by 0 days.

(21) Appl. No.: 13/301,792

(22) Filed: Nov. 22, 2011

(65) Prior Publication Data

US 2013/0132874 A1 May 23, 2013

(51) Int. Cl.
*G06F 3/048* (2013.01)
*G06F 3/0481* (2013.01)

(52) U.S. Cl.
CPC ............................. *G06F 3/04817* (2013.01)
USPC ........................................................ 715/765

(58) Field of Classification Search
USPC ........................................................ 715/765
See application file for complete search history.

(56) References Cited

U.S. PATENT DOCUMENTS

| | | | | |
|---|---|---|---|---|
| 5,801,699 A | * | 9/1998 | Hocker et al. | 715/837 |
| 5,819,245 A | * | 10/1998 | Peterson et al. | 706/16 |
| 2006/0288311 A1 | * | 12/2006 | Heer et al. | 715/853 |
| 2007/0083827 A1 | * | 4/2007 | Scott et al. | 715/811 |
| 2008/0074384 A1 | * | 3/2008 | Orr et al. | 345/156 |
| 2008/0219564 A1 | * | 9/2008 | Covell et al. | 382/224 |
| 2011/0252350 A1 | * | 10/2011 | Chaudhri | 715/769 |
| 2013/0024234 A1 | * | 1/2013 | Novales et al. | 705/7.21 |

* cited by examiner

*Primary Examiner* — William Bashore
*Assistant Examiner* — Rayeez Chowdhury
(74) *Attorney, Agent, or Firm* — Brinks Gilson & Lione

(57) ABSTRACT

Automatically arranging icons on a user interface is provided. A plurality of icons associated with items are received and displayed on the user interface. An importance score for each icon of the plurality of icons and a similarity score between two or more of the plurality of icons are determined. Further, a user interface coordinate is assigned to at least a portion of the plurality of icons based on the importance and similarity scores. The user interface is then displayed with the at least a portion of the plurality of icons according to the user interface coordinate.

20 Claims, 5 Drawing Sheets

AUTOMATICALLY ARRANGING OF ICONS ON A USER INTERFACE

FIELD OF THE INVENTION

Embodiments of the present disclosure relate, generally, to computer software, and more specifically, to arranging icons on a user interface.

BACKGROUND

Typically, in electronic devices such as mobiles or computers, items are accessed using listing, icon walls or tree-like structures like directories. The items can include one of files, applications, shortcuts or URLs (Universal Resource Locators). A user can access them by tapping or clicking the icons associated with the items. However, in devices with large number of items, or having limited display space, accessing items is a cumbersome process. The user may need to scroll down on a screen of the user interface, or navigate directory trees to access the items.

Based on the foregoing, there is a need for a method and system for automatically arranging icons on a user interface and to overcome the abovementioned shortcomings.

SUMMARY

An example of a method for automatically arranging icons on a user interface includes receiving a plurality of icons associated with items and displayed on the user interface. The method also includes determining an importance score for each icon of the plurality of icons and a similarity score between two or more of the plurality of icons. Further, the method includes assigning a user interface coordinate to at least a portion of the plurality of icons based on the importance and similarity scores. Further, the method also includes displaying the user interface with the at least a portion of the plurality of icons according to the user interface coordinate.

An example of a computer program product for use with a computer. The computer program product comprising a non-transitory computer-readable medium that when executed by a processor, performs a method for automatically arranging icons on a user interface. The method includes receiving a plurality of icons associated with items and displayed on the user interface, determining an importance score for each icon of the plurality of icons and a similarity score between two or more of the plurality of icons, assigning a user interface coordinate to at least a portion of the plurality of icons based on the importance and similarity scores and displaying the user interface with the at least a portion of the plurality of icons according to the user interface coordinate.

An example of a device for automatically arranging icons on a user interface includes a receiving module to receive a plurality of icons associated with items and displayed on the user interface. The device also includes an icon analyzer to determine an importance score for each icon of the plurality of icons and a similarity score between two or more of the plurality of icons, a mapping module to assign a user interface coordinate to at least a portion of the plurality of icons based on the importance and similarity scores and an output module to display the user interface with the at least a portion of the plurality of icons according to the user interface coordinate.

The features described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE FIGURES

In the following drawings like reference numbers are used to refer to like elements. Although the following figures depict various examples of the invention, the invention is not limited to the examples depicted in the figures.

Figure 1:
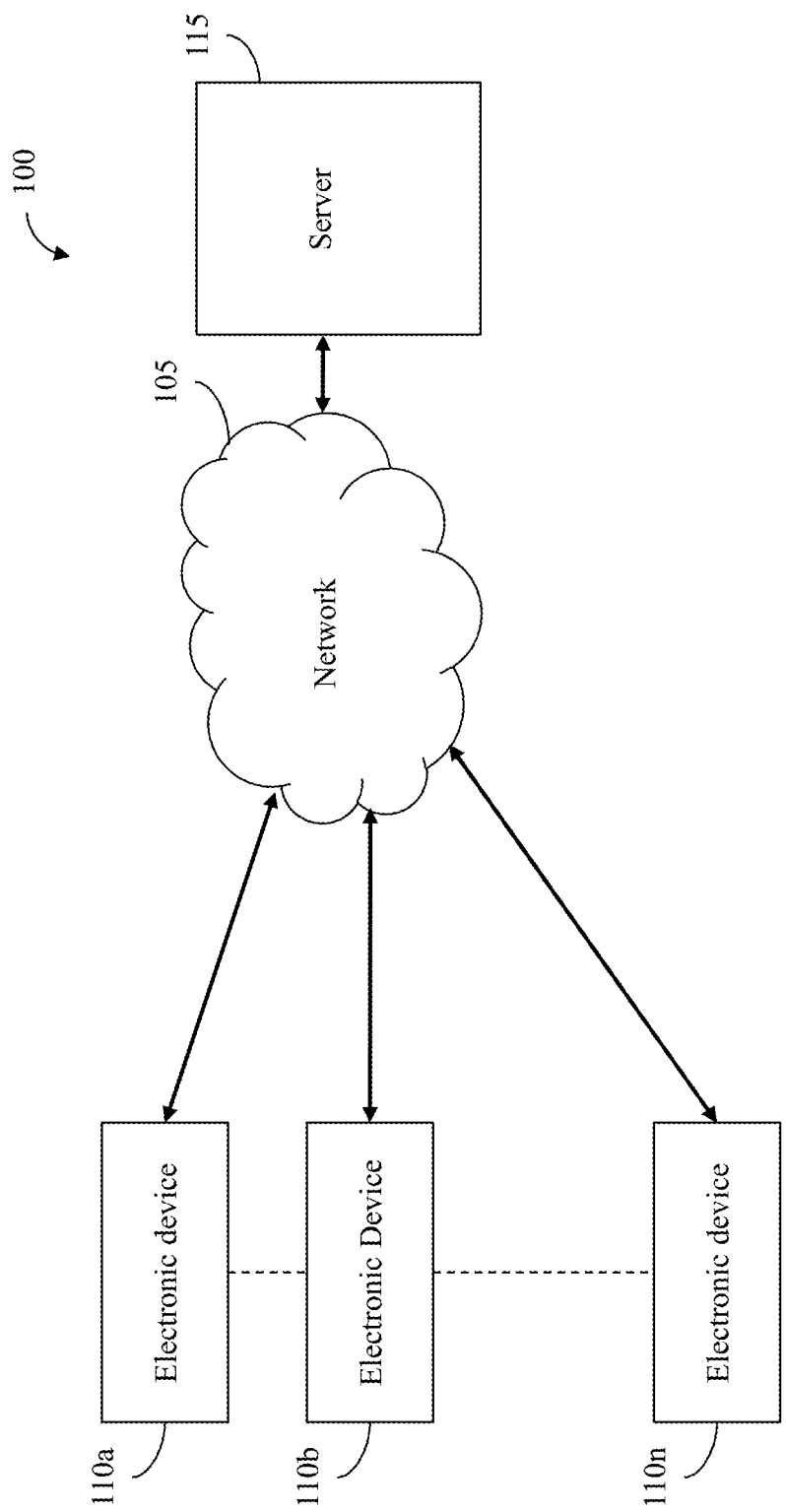
FIG. 1 illustrates a block diagram of an environment for automatically arranging icons on a user interface, in accordance with various embodiments.

The embodiments have been represented where appropriate by conventional symbols in the drawings, showing only those specific details that are pertinent for understanding the embodiments of the present invention so as not to obscure the disclosure with details that will be readily apparent to those of ordinary skill in the art having the benefit of the description herein.

DETAILED DESCRIPTION OF THE EMBODIMENTS

The present disclosure describes a method, system and computer program product for automatically arranging icons on a user interface. For example, gaming applications, productivity applications, financial applications, and social media applications can be automatically placed on a grid, resulting a layout that has these functional groups naturally. Advantageously, a user of a device with limited screen space such as a mobile device can more easily navigate amongst applications. The following detailed description is intended to provide example implementations to one of ordinary skill in the art, and is not intended to limit the invention to the explicit disclosure, as one or ordinary skill in the art will understand that variations can be substituted that are within the scope of the invention as described.

FIG. 1 illustrates a block diagram of an environment 100, in accordance with various embodiments. The environment 100 includes a network 105, one or more electronic devices, for example an electronic devices 110a-n (hereinafter collectively referred to as "device 110"). The device 110 is connected to a server 115 through the network 105. The server 115 can also be a web server.

Examples of the electronic devices include, but are not limited to, computers, mobile devices, laptops, palmtops, internet protocol televisions (IPTVs), personal digital assistants (PDAs), cell phones, smart phones, and tablet computers. Examples of the network 105 include, but are not limited to, a Local Area Network (LAN), a Wireless Local Area Network (WLAN), a Wide Area Network (WAN), wired network, wireless network, internet and a Small Area Network (SAN).

The device 110 may be communicably coupled to the server 115 through the network 105. The server 115 may provide users of the device 110 access to obtaining device applications.

In an embodiment, the device 110 can include a plurality of applications. The applications are displayed as icons on a user interface of the device 110. Examples of the icons can also include a link to mobile applications, files, folders, shortcuts, hyperlinks, URLs (Universal Resource Locators), and widgets. Other examples of icons include thumbnails or other forms of representation such as attached text. A user of the device 110 can access the applications by clicking (or double clicking), pressing with a finger, or tapping the icons of the applications on the user interface. In the device 110, the icons associated with the applications are represented in a hierarchical structure. In one embodiment, the icons are arranged in a hierarchical form using similarity score and an importance score. The applications with higher similarity scores between each other are arranged nearer to each other on the grid by a visualization algorithm. Additionally, the 2D coordinates on the grid can be arranged in a hierarchical structure for navigations by the users, in which the importance score determines the order of the applications within a partition of the grid.

The device 110 can include one or more hardware elements. The device 110 including hardware elements are explained in detail in conjunction with FIG. 2.

Figure 2:
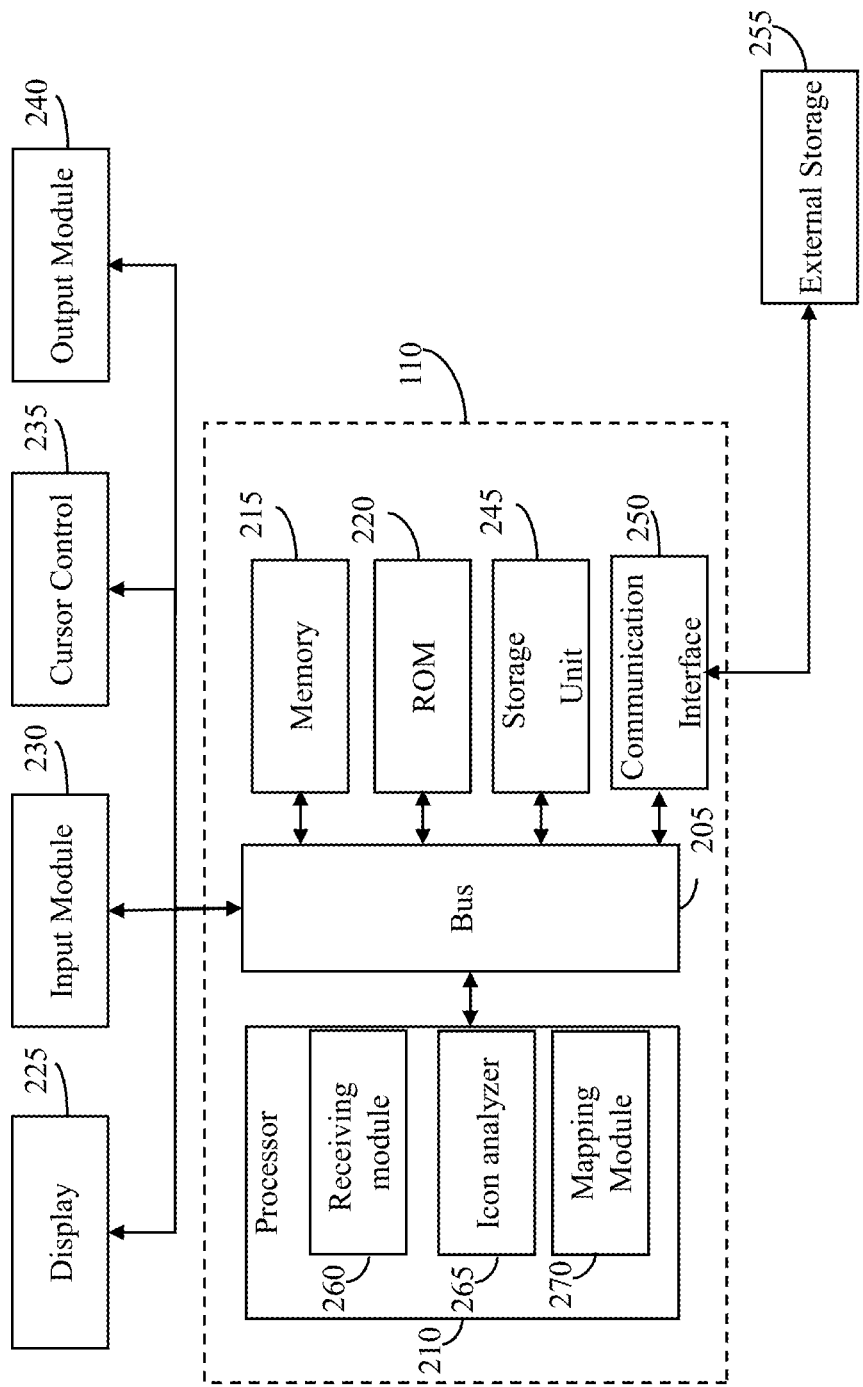
FIG. 2 illustrates a block diagram of a device to automatically arrange icons on a user interface, in accordance with various embodiments.

FIG. 2 illustrates a block diagram of the device 110, in accordance with an exemplary embodiment. The device 110 includes a bus 205 for communicating information, and a processor 210 coupled with the bus 205 for processing information. The device 110 also includes a memory 215, for example a random access memory (RAM) coupled to the bus 205 for storing instructions or program code to be executed by the processor 210. The memory 215 can be used for storing temporary information required by the processor 210. The device 110 further includes a read only memory (ROM) 220 or other static storage unit coupled to the bus 205 for storing static information and instructions for processor 210. A storage unit 245, such as a magnetic disk or hard disk, can be provided and coupled to the bus 205 for storing information and device applications.

The device 110 can be coupled via the bus 205 to a display 225, for example a cathode ray tube (CRT) or liquid crystal display (LCD), for displaying information. An input module 230, including various keys, is coupled to the bus 205 for communicating information and command selections to the processor 210. In some embodiments, cursor control 235, for example a mouse, a trackball, a joystick, or cursor direction keys, for command selections to the processor 210 and for controlling cursor movement on the display 225 can also be present. The cursor control 235 allows the user to select icons on a user interface. An output module 240 is also coupled to the device 110. In some embodiments, the display 225 may perform the functions of the input device 230 and the output module 240. For example, consider a touch screen display operable to receive haptic input and provide output.

Various embodiments are related to the use of the device 110 for implementing the techniques described herein. The techniques can be performed by the device 110 in response to the processor 210 executing instructions included in the memory 215. The instructions can be read into the memory 215 from another machine-readable medium, such as the storage unit 245. Execution of the instructions included in the memory 215 causes the processor 210 to perform the techniques described herein.

The term machine-readable medium can be defined as a medium providing data to a machine to enable the machine to perform a specific function. The machine-readable medium can be a storage media, or of some other non-transitory form. Storage media can include non-volatile media and volatile media. The memory 215 can be a volatile media. All such media must be tangible to enable the instructions carried by the media to be detected by a physical mechanism that reads the instructions into the machine.

Examples of the machine readable medium includes, but are not limited to, a non-transitory medium, a floppy disk, a flexible disk, hard disk, magnetic tape, a CD-ROM, optical disk, punchcards, papertape, a RAM, a PROM, EPROM, and a FLASH-EPROM.

In some embodiments, the machine-readable medium can be transmission media including coaxial cables, copper wire and fiber optics, including the wires that include the bus 205. Transmission media can also take the form of acoustic or light waves, such as those generated during radio-wave and infra-red data communications. Examples of machine-readable medium may include but are not limited to carrier waves as describer hereinafter or any other media from which the device 110 can read, for example online software, download links, installation links, and online links. For example, the instructions can initially be carried on a magnetic disk of a remote computer. The remote computer can load the instructions into its dynamic memory and send the instructions over a telephone line using a modem. A modem local to the device 110 can receive the data on the telephone line and use an infra-red transmitter to convert the data to an infra-red signal. An infra-red detector can receive the data carried in the infra-red signal and appropriate circuitry can place the data on the bus 205. The bus 205 carries the data to the memory 215, from which the processor 210 retrieves and executes the instructions. The instructions received by the memory 215 can optionally be stored on the storage unit 245 either before or after execution by the processor 210. All such media must be tangible to enable the instructions carried by the media to be detected by a physical mechanism that reads the instructions into a machine.

The device 110 also includes a communication interface 250 coupled to the bus 205 for enabling data communication. Examples of the communication interface 250 include, but are not limited to, an integrated services digital network (ISDN) card, a modem, a local area network (LAN) card, an infrared port, a Bluetooth port, a zigbee port, and a wireless port.

The device 110 can be coupled to an external storage 255 that stores the applications. In some embodiments, the applications can be stored in the storage unit 245 of the device 110.

In an embodiment, data associated with a plurality of icons associated with items is received by the processor 210 and displayed on the user interface (display 225) of the device 110. The processor 210 (or other graphics processor or hardware) determines an importance score for each icon of the plurality of icons and a similarity score between two or more of the plurality of icons. Further, the processor 210 assigns a user interface coordinate to at least a portion of the plurality of icons based on the importance and similarity scores. The output module 240 (or the display 225) then displays the user interface (display 225) with the at least a portion of the plurality of icons according to the user interface coordinate.

In some embodiments, the processor 210 can include one or more processing units for performing one or more functions of the processor 210 such as a receiving module 260 to receive a plurality of icons associated with items and displayed on the user interface, an icon analyzer 265 to determine an importance score for each icon of the plurality of icons and a similarity score between two or more of the plurality of icons, and a mapping module 270 to assign a user interface coordinate to at least a portion of the plurality of icons based on the importance and similarity scores. The processing units are hardware circuitry performing specified functions. In general, the processing units and modules can include hardware, software instructions, or a combination of both. For example, modules 260, 265, 270 could operate as program code stored in memory 215.

It may be appreciated by any person skilled in the art that the above description of various functional modules may include main embodiments of the present disclosure. Further, there may be other embodiments and functional modules that may be suitable for the subject matter and may be implemented in light of the description present in this disclosure. Also, various modules of the device 110 may be understood more clearly when read in conjunction with the method of FIG. 3.

Figure 3:
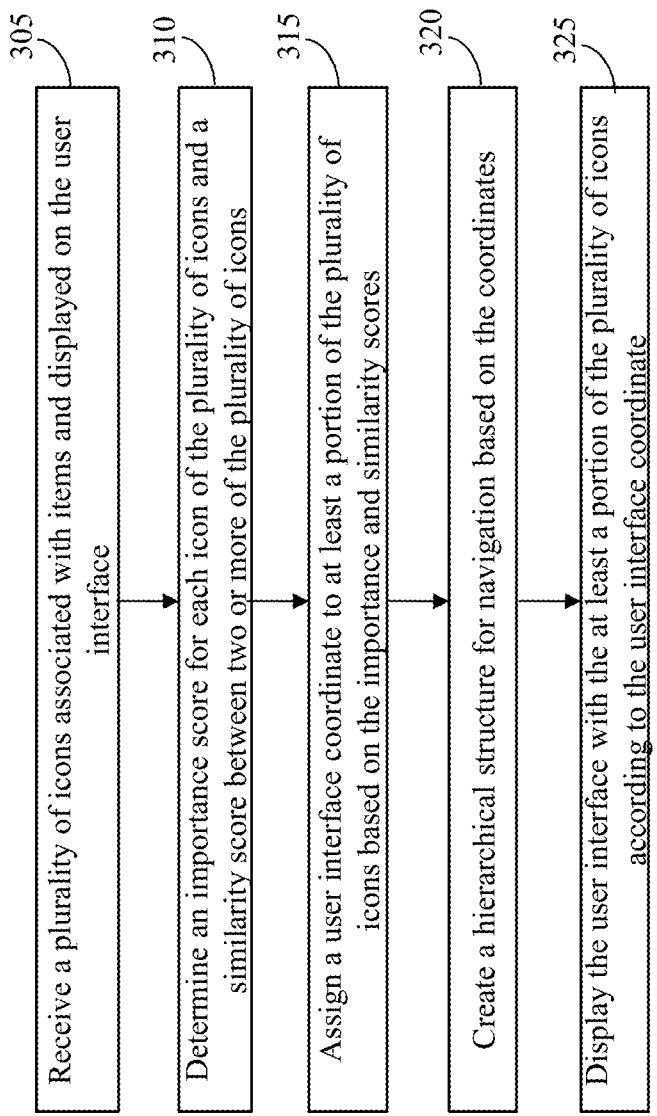
FIG. 3 is a flowchart illustrating a method for automatically arranging icons on a user interface, in accordance with various embodiments.

FIG. 3 is a flow-chart illustrating a method for automatically arranging icons on a user interface. In an embodiment, the automatically arranging of the icons, and updates to the arrangement, can be performed by the device 110 on a predetermined time. In another embodiment, the automatically arranging of the icons can be performed whenever a new icon is detected by the device 110.

At step 305, a plurality of icons associated with items are received and displayed on the user interface. The items can refer to an application, a mobile application, a file, a photo, a shortcut, a hyperlink, a URL, and a widget.

The icons can be stored locally in the storage unit 245.

At step 310, an importance score for each icon of the plurality of icons and a similarity score between two or more of the plurality of icons are determined.

In one embodiment, information concerning user interactions with the plurality of icons is received. The time spent on items corresponding to the icons is used to determine the importance score. In addition, a semantic analysis on the items corresponding to their description is performed.

In a second embodiment, the importance score is based on the determining of frequency that an item associated with an icon is accessed. Higher frequency of access will result in a higher importance score. In addition, properties associated with the plurality of icons are determined. File creation time for the items associated with plurality of icons are used to determine the similarity score.

Other embodiments are possible to determine importance and similarity scores. Importance can also be determined from a direct indication or rating from a user, collective statistics from a plurality of users, an online database, a company policy, a user policy, a type of application, OEM data, location within a directory tree, number of users that access an application, time between application accesses, a user mood, time of day, location (e.g., GPS location), and the like. Similarity can also be determined by a direct indication or rating from a user, type of application, author or distributor of software, relation to recent applications accessed by a user, and the like.

At step 315, a user interface coordinate is assigned to at least a portion of the plurality of icons based on the importance and similarity scores. In one embodiment, a similarity score can be used primarily for computing the layout of icons on a grid, while an importance score is used primarily for ordering within a partition of the grid. Further, similarity and importance scores can be used for determining how groups of icons are arranged in relation to each other. In some embodiments, the similarity score determines the layout of all objects which can result in similar objects being placed near each other. Further, a global placement of clusters of objects and an inner structure of clusters can also be determined by similarity score.

The assigning of the user interface coordinate to the plurality of icons based on the importance and similarity scores can be performed using one or more visualization algorithms. For example, a greedy strategy or a manifold learning algorithm. The greedy strategy follows the problem solving heuristic of making the locally optimal choice at each stage with the hope of finding the global optimum. Manifold learning algorithms attempt to uncover parameters in order to find a low-dimensional representation of the data.

Example 1

Consider a plurality of mobile applications (apps for short) $x_i$, where i=1,K,N. The similarity score $s(x_i,x_j)$ for arbitrary pair $(x_i, x_j)$ is defined as the cosine of the angle between them $$s(x_i, x_j) = \frac{x_i^T x_j}{\|x_i\| \cdot \|x_j\|}$$

in a pre-computed semantic space $R^d$, using methods like pLSA. Since the space captures the semantic similarity of the apps from their descriptions (about their functions) and reviews, the chosen similarity score reflects the similarity of functionality between apps.

Figure 4:
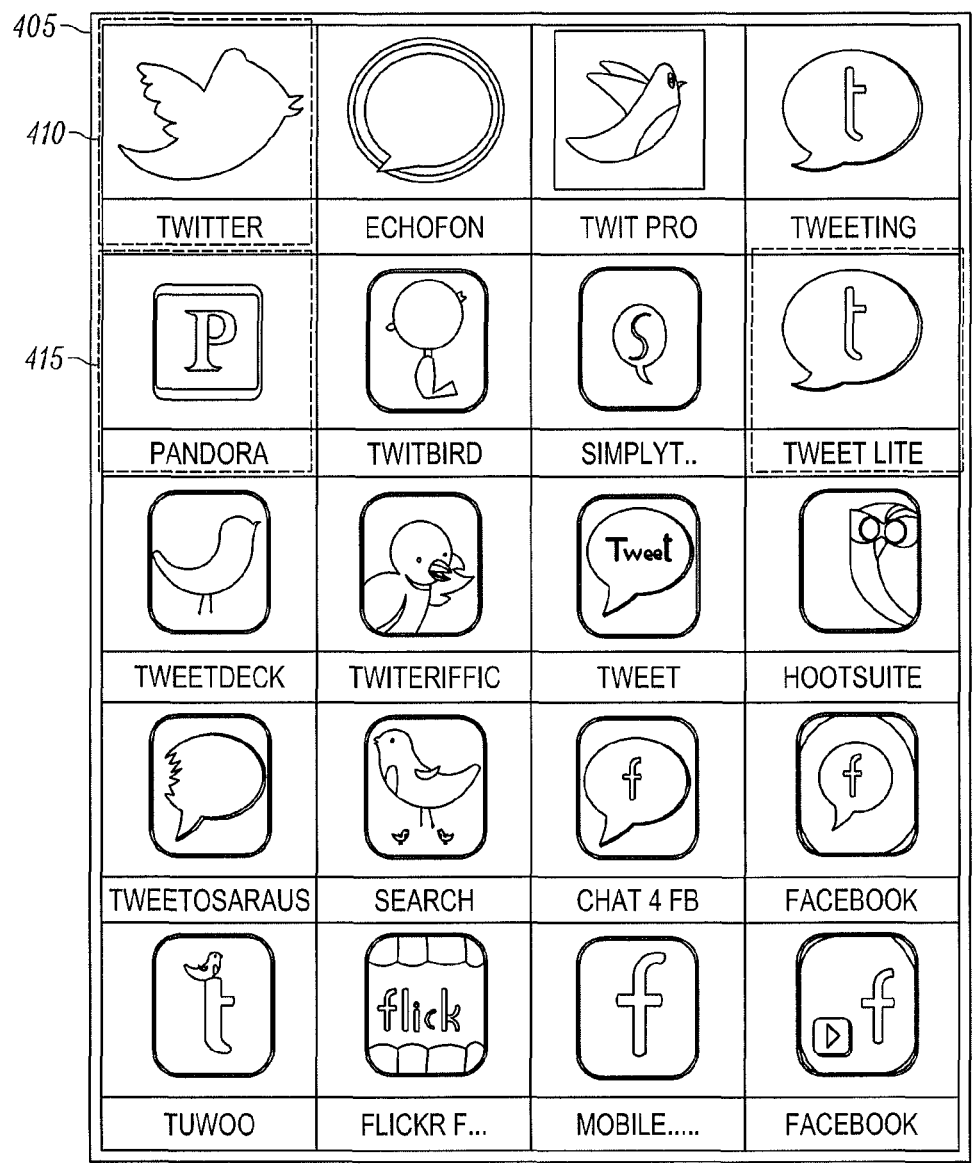
FIG. 4 is an exemplary illustration of a user interface displaying automatically arranged icons, in accordance with various embodiments.

A greedy strategy iteratively places all applications on a rectangle grid of r×c≤N size. First, choose one of the applications, e.g. $x_1$ and put it on (0,0). Then there are three neighboring empty cells at (0,1), (1,1) and (1,0), where the three most similar apps to $x_1$ can be placed. Likewise in each turn we may pick out the most similar apps for those apps that still have neighboring empty cells, until all apps are placed on the grid. So far, for each app $x_i$, the corresponding 2D coordinates $y_i$ are obtained (e.g. part of the apps are shown in FIG. 4).

The placement attempts to place those most similar apps around and hence the final layout of app has apps of similar functions near to each other, forming virtual groups of apps. For example, several apps may all serve as a client of Twitter (see e.g., FIG. 4) and naturally their descriptions or reviews contains quite similar words. Therefore the method above will place these apps near to each other.

With $y_i$, the apps may be shown as an icon wall of very large size, which is inconvenient for the user to explore, especially when we have quite limited space (the figure is the typical mobile screen size).

A hierarchical structure is built to facilitate navigation. The importance score $p(x_i)$ is the popularity of the app. For example, a patch size of w×h=4×3 is used to create the hierarchical structure. Let $R_{s,t}$ be the rectangles from (sw,th) to ((s+1)w−1, (t+1)h−1). The most important app in each rectangle $R_{s,t}$ is picked as an exemplar. In this way, an upper layer icon wall is obtained with much fewer apps.

Figure 5:
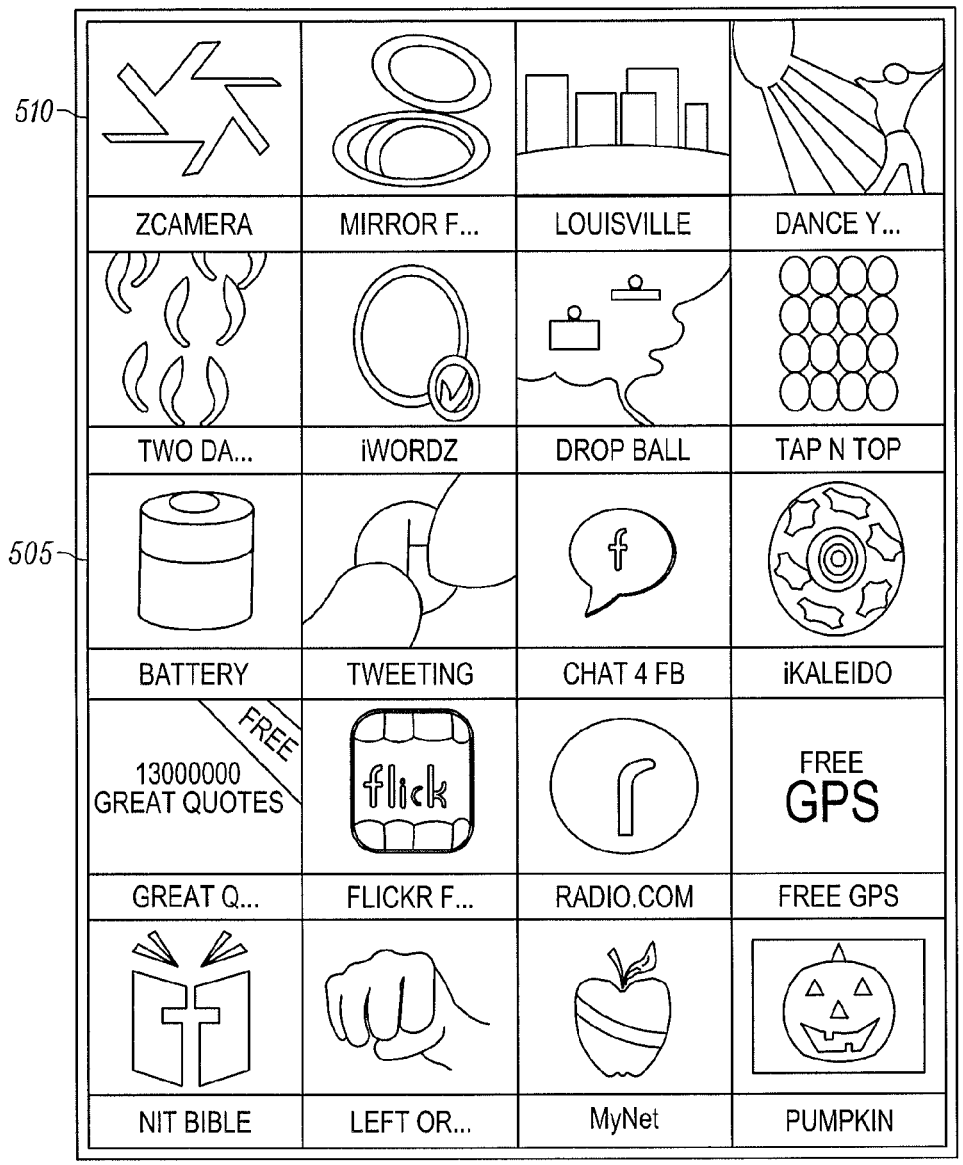
FIG. 5 is an exemplary illustration of a user interface displaying automatically arranged icons at a higher hierarchical level than FIG. 4, in accordance with various embodiments.

As in the FIG. 5, from all apps in shown rectangle, the most popular app is Twitter's official app and it will be shown in the upper layer.

By iteratively applying the same procedure until we have a layer small enough for the user, multiple layers are obtained. The user may navigate to different layer by zooming in or zooming out. On the same layer, the user can move around by flipping as usual. In this way, the more popular apps in a set of similar apps will be visible to the user on the upper layer.

Usually the user starts to navigate the apps from the top layer, which consists of diverse apps, which are most popular in apps with similar functions. When the user wants to see more similar apps, he/she zooms in and more apps of similar functions will appear. If the user wants to see apps of quite different functions, he/she may zoom out.

Different ways of navigation is possible by changing the similarity score or importance score. In one embodiment, the most recently used app has the largest importance score: the top apps are those user last used. In another embodiment, the importance score is the frequency the user uses the app: the top apps are those most used apps. In still another embodiment, the similarity score is the color similarity of the app's icon: the apps with similar color of icons will be near to each other;

Say we have 16 items to arrange. Denote $I_1=0, I_2=1, K, I_{10}=9, I_{11}=A, I_{12}=B, K, I_{16}=F$ for them respectively. The similarity scores between them make a matrix S: the element of the ith row and the jth column is $s(I_i, I_j)$.

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | – | 0.9 | 0.9 | 0.6 | 0 | 0 | 0 | 0 | 0 | 0 | 0 | 0 | 0 | 0 | 0 | 0 |
| 1 | 0.9 | – | 0.8 | 0.9 | 0 | 0 | 0 | 0 | 0 | 0 | 0 | 0 | 0 | 0 | 0 | 0 |
| 2 | 0.9 | 0.8 | – | 0.9 | 0 | 0 | 0 | 0 | 0 | 0 | 0 | 0 | 0 | 0 | 0 | 0 |
| 3 | 0.6 | 0.9 | 0.9 | – | 0 | 0 | 0.2 | 0 | 0 | 0 | 0 | 0 | 0 | 0.1 | 0 | 0 |
| 4 | 0 | 0 | 0 | 0 | – | 0.8 | 0.9 | 0.5 | 0 | 0 | 0 | 0 | 0 | 0 | 0 | 0 |
| 5 | 0 | 0 | 0 | 0 | 0.8 | – | 0.7 | 0.8 | 0 | 0 | 0 | 0 | 0 | 0 | 0 | 0 |
| 6 | 0 | 0 | 0 | 0.2 | 0.9 | 0.7 | – | 0.9 | 0.1 | 0 | 0 | 0 | 0 | 0 | 0 | 0 |
| 7 | 0 | 0 | 0 | 0 | 0.5 | 0.8 | 0.9 | – | 0 | 0.2 | 0 | 0 | 0 | 0 | 0 | 0 |
| 8 | 0 | 0 | 0 | 0 | 0 | 0 | 0.1 | 0 | – | 0.9 | 0.9 | 0.4 | 0 | 0.1 | 0 | 0 |
| 9 | 0 | 0 | 0 | 0 | 0 | 0 | 0.2 | 0 | 0.9 | – | 0.7 | 0.8 | 0 | 0 | 0 | 0 |
| A | 0 | 0 | 0 | 0 | 0 | 0 | 0 | 0 | 0.9 | 0.7 | – | 0.7 | 0 | 0 | 0 | 0 |
| B | 0 | 0 | 0 | 0 | 0 | 0 | 0 | 0 | 0.4 | 0.8 | 0.7 | – | 0 | 0 | 0 | 0 |
| C | 0 | 0 | 0 | 0 | 0 | 0 | 0 | 0 | 0 | 0 | 0 | 0 | – | 0.9 | 0.9 | 0.6 |
| D | 0 | 0 | 0 | 0.1 | 0 | 0 | 0 | 0 | 0.1 | 0 | 0 | 0 | 0.9 | – | 0.6 | 0.9 |
| E | 0 | 0 | 0 | 0 | 0 | 0 | 0 | 0 | 0 | 0 | 0 | 0 | 0.9 | 0.6 | – | 0.8 |
| F | 0 | 0 | 0 | 0 | 0 | 0 | 0 | 0 | 0 | 0 | 0 | 0 | 0.6 | 0.9 | 0.8 | – |

If we put 0 at (0,0), the most similar items 1 and 2 will be placed around 0, at (1,0) and (0,1) while the less similar item 3 will be placed at (1,1). Then we check other empty cells near this region, following the same rule of placing the most similar items near.

```
E  F  A  B
C  D  8  9
2  3  6  7
0  1  4  5
```

So if we consider to hierarchicalize it by using a patch of 2×2, the importance score can choose from each patch the most important item. Let's say item 1 has highest importance score among item 0, 1, 2 and 3.

```
D  B
1  7
```

Turning again to FIG. 3, at step 320, a hierarchical structure based on the coordinates is created for navigation. One example of the hierarchical structure is discussed below with respect to FIG. 4 and FIG. 5.

At step 325, the user interface is displayed with the at least a portion of the plurality of icons according to the user interface coordinate.

During navigation of the user interface, a user may prefer to zoom-in or zoom-out of the display of the user interface. A hierarchicalization process decides on which scale the items on the user interface are shown. The hierarchicalization process is implemented using one of a one layer wise recursion or a bottom-up process.

The user interface is represented in a hierarchical form in which a top level icon represents multiple lower level icons.

In an embodiment, the user interface has multiple grids and each grid is denoted using coordinates $x_i, y_i$. We have $r_m$ rows and $c_m$ columns, and we prefer $x_i=0, \ldots, r_m-1; y_i=0, \ldots, c_m$. In addition, there is a scaling factor $s_r$ and $s_c$ for the rows and columns respectively. This defines the size of the icon wall, or the factor of the wall size. At a first scale, each grid corresponds into a patch size of $s_r*s_r$. Each grid is assigned an icon based on the user interface coordinate defined in step 315. Given the icon's coordinates x,y on the first scale, on a second scale, the coordinates are (x−x mod sr)/sr; (y−y mod sc)/sc.

So given an icon's coordinates (x; y) at scale 0 (first) level, the corresponding coordinates at scale i would be approximately $$x^{(i)} = \left\lfloor \frac{x}{s_r^i} \right\rfloor, \quad y^{(i)} = \left\lfloor \frac{y}{s_c^i} \right\rfloor \tag{1}$$

or letting f(z|s)=(z−z mod s)/s, $$x^{(i)} = f^{(i)}\left(\frac{x}{s_r}\right), \quad y^{(i)} = f^{(i)}\left(\frac{y}{s_c}\right) \tag{2}$$

Where $f^{(i)}$ denotes the composition of f for i times.

The above process defines a bottom-up process that shows the scale at which the items are shown.

Upon scaling of the icons, the plurality of icons is displayed.

FIG. 4 is an exemplary illustration of a user interface displaying auto arranged icons.

A user interface 405 of a device is shown. Here, the similarity scores are based on a semantic analysis of description of the applications. The time spent by a user on each of these applications determines the importance score, in one embodiment. Based on the similarity scores and the importance score, the icons are displayed at various coordinates on the user interface. For example, twitter related applications are placed near by each other in FIG. 4. Nearby applications include other social networks like Pandora.

FIG. 5 is an exemplary illustration of a user interfaced displaying auto arranged icons at a higher hierarchical level than FIG. 4. In one embodiment, when the user zooms out, he/she reaches the upper layer in the hierarchical structure. Then only the most used application of this partition, namely the official twitter client in row 505. Other icons most used applications of a group are also shown in row 510 and other rows. In other embodiments, more than two layers are of icons are possible. Furthermore, some icons can appear in more than one layer.

The present disclosure provides for automatically arranging icons on a user interface. In addition, the present disclosure enables hierarchical navigation of user interface and facilitates the user experience. The invention enables the user to easily identify and access the various items (files) on the user interface.

The present disclosure may also be embodied in a computer program product for automatically arranging icons on a user interface. The computer program product may include a non-transitory computer usable medium having a set program instructions comprising a program code for receiving a plurality of icons associated with items and displayed on the user interface, determining an importance score for each icon of the plurality of icons and a similarity score between two or more of the plurality of icons, assigning a user interface coordinate to at least a portion of the plurality of icons based on the importance and similarity scores and displaying the user interface with the at least a portion of the plurality of icons according to the user interface coordinate. The set of instructions may be in the form of a software program. Further, the software may be in the form of a collection of separate programs, a program module with a large program or a portion of a program module, as in the present invention. The software may also include modular programming in the form of object-oriented programming. The processing of input data by the processing machine may be in response to user commands, results of previous processing or a request made by another processing machine.

While the preferred embodiments of the invention have been illustrated and described, it will be clear that the invention is not limit to these embodiments only. Numerous modifications, changes, variations, substitutions and equivalents will be apparent to those skilled in the art without departing from the spirit and scope of the invention, as described in the claims.

The foregoing description sets forth numerous specific details to convey a thorough understanding of embodiments of the invention. However, it will be apparent to one skilled in the art that embodiments of the invention may be practiced without these specific details. Some well-known features are not described in detail in order to avoid obscuring the invention. Other variations and embodiments are possible in light of above teachings, and it is thus intended that the scope of invention not be limited by this Detailed Description, but only by the following Claims.

What is claimed is:

1. A computer-implemented method for automatically arranging icons on a user interface, comprising:
receiving a plurality of icons associated with items and displayed on the user interface, wherein user interface comprises a hierarchical user interface having a top grid layer and one or more partition layers in which an icon on the top grid layer represents multiple lower level icons on one of the partition layers;
determining an importance score for each icon of the plurality of icons;
determining a similarity score between two or more of the plurality of icons;
assigning first user interface coordinates to a first portion of the plurality of icons based on the similarity scores, wherein the first user interface coordinates are assigned by iteratively assigning the first portion of icons along a rectangular grid of the top grid layer so that the icons sharing most similar functions are located closest to each other on the top grid layer;
assigning second user interface coordinates to a second portion of the plurality of icons based on the importance scores, wherein the second user interface coordinates are assigned by iteratively assigning the second portion of icons along a rectangular grid of a partition layer so that the icons are arranged in decreasing order of importance on the partition layer; and
displaying the user interface with the first and second portions of the plurality of icons displayed according to the first and second user interface coordinates, such that the first portion of the plurality of icons are displayed when the top grid layer is displayed and the second portion of the plurality of icons are displayed when the partition layer is displayed.

2. The method of claim 1, wherein determining the importance score comprises:
receiving information concerning user interactions with the plurality of icons.

3. The method of claim 1, wherein determining the importance score comprises:
determining a frequency that an item associated with an icon is accessed.

4. The method of claim 1, wherein determining the similarity score comprises:
receiving properties associated with the plurality of icons.

5. The method of claim 1, wherein determining the similarity score comprises:
performing a semantic analysis on an item associated with an icon.

6. The method of claim 1, further comprising:
automatically updating the display of the user interface responsive to receiving an updated importance score or receiving an updated similarity score.

7. The method of claim 1, wherein the plurality of icons are associated with at least one or a combination of:
an application, a mobile application, a file, a shortcut, a hyperlink, a URL, and a widget.

8. A computer program product stored on a non-transitory computer-readable medium that when executed by a processor, performs a method for automatically arranging icons on a user interface, comprising:
receiving a plurality of icons associated with items and displayed on the user interface, wherein the user interface comprises a hierarchical user interface in which a top level icon on a grid layer represents multiple lower level icons on a partition layer;
determining an importance score for each icon of the plurality of icons;

determining a similarity score between two or more of the plurality of icons;

assigning first user interface coordinates to a first portion of the plurality of icons based on the similarity scores, the assigning done so that icons sharing most similar functions are located closest to each other along a rectangular grid on the grid layer;

assigning second user interface coordinates to a second portion of the plurality of icons based on the importance scores, the assigning done so that icons having the highest importance score are displayed first along a rectangular grid on the partition layer; and displaying the user interface with the at least a portion of the plurality of icons displayed according to the first and second user interface coordinates, such that the first portion of the plurality of icons are displayed when the grid layer is displayed and the second portion of the plurality of icons are displayed when the partition layer is displayed.

9. The method of claim 8, wherein determining the importance score comprises:

receiving information concerning user interactions with the plurality of icons.

10. The method of claim 8, wherein determining the importance score comprises:

determining a frequency that an item associated with an icon is accessed.

11. The method of claim 8, wherein determining the similarity score comprises:

receiving properties associated with the plurality of icons.

12. The method of claim 8, wherein determining the similarity score comprises:

performing a semantic analysis on an item associated with an icon.

13. The method of claim 8, further comprising:

automatically updating the display of the user interface responsive to receiving an updated importance score or receiving an updated similarity score.

14. The method of claim 8, wherein the plurality of icons are associated with at least one or a combination of:

an application, a mobile application, a file, a shortcut, a hyperlink, a URL, and a widget.

15. A device for automatically arranging icons on a user interface, comprising:

a receiving module to receive a plurality of icons associated with items and displayed on the user interface having an upper level and multiple lower levels;

an icon analyzer to determine an importance score for each icon of the plurality of icons and a similarity score between two or more of the plurality of icons;

a mapping module to assign an upper level user interface coordinate to at least a first portion of the plurality of icons based on similarity scores and a lower level user interface coordinate to a least a second portion of the plurality of icons based on the importance scores, wherein the upper level and lower level user interface coordinates are defined according to a two-dimensional coordinate system, and the assigning is done by iteratively assigning the icons along a rectangular grid so that the icons sharing most similar functions are located closest to each other on the upper level and the icons are ordered based on highest importance on the lower levels; and an output module to display the user interface with the at least a portion of the plurality of icons according to the upper level and lower level user interface coordinates, such that the first portion of the plurality of icons are displayed when the upper level is displayed and the second portion of the plurality of icons are displayed when the lower level is displayed.

16. The device of claim 15, wherein determining the importance score comprises:

receiving information concerning user interactions with the plurality of icons.

17. The device of claim 15, wherein determining the similarity score comprises:

receiving properties associated with the plurality of cons.

18. The device of claim 15, wherein a top level icon displayed on the upper level represents multiple lower level icons displayed on one of the lower levels.

19. The method of claim 1, wherein a partition layer of the one or more partition layers is displayed in response to a user selecting a top grid layer icon displayed on the top grid layer.

20. The method of claim 19, wherein the displayed partition layer contains multiple lower level icons that are all related to the selected top grid layer icon.

* * * * *